United States Patent [19]

Wood

[11] 4,175,898
[45] Nov. 27, 1979

[54] TOOL CHANGING APPARATUS

[76] Inventor: Edward H. Wood, Rte. 12, Box 494, Sanford, N.C. 27330

[21] Appl. No.: 876,992

[22] Filed: Feb. 13, 1978

[51] Int. Cl.² ............................................. B23C 5/26
[52] U.S. Cl. .................................. 409/233; 408/239 A
[58] Field of Search ..................... 408/239 R, 239 A; 90/11 D

[56] References Cited

U.S. PATENT DOCUMENTS

| | | | |
|---|---|---|---|
| 2,883,889 | 3/1959 | Diener | 408/239 A X |
| 3,027,812 | 3/1962 | Courtois | 90/11 D |
| 3,038,386 | 6/1962 | Parske et al. | 90/11 D |
| 3,374,711 | 3/1968 | Saunders | 408/239 A |
| 3,643,969 | 2/1972 | Finley et al. | 90/11 A X |
| 3,898,911 | 8/1975 | DeCaussin | 408/239 X |

*Primary Examiner*—Gil Weidenfeld

[57] ABSTRACT

An apparatus for power assisted locking and unlocking of cutting, grinding, or like tools received within the tool holder of a machine such as a vertical milling machine or the like. The described machine includes a spindle and a quill, and the tool is received within a collet held in a taper at the end of the spindle. A drawbar extends through the spindle and holds the collet into the taper locking the tool in the collet opening. The locking and unlocking apparatus includes a drawbar driving motor, a drawbar driving member associated with the motor, and means associated with the drawbar for providing a drive connection between the drawbar and the motor when the drawbar is in a pedetermined position. Means are provided to position the drawbar so that a part thereof engages the motor drive at the same time that a switch is closed so as to energize the motor and cause it to rotate the drawbar in one direction or the other. The motor drive is preferably of the impact type so as to insure application of controlled torque to the drawbar for both locking and unlocking.

5 Claims, 4 Drawing Figures

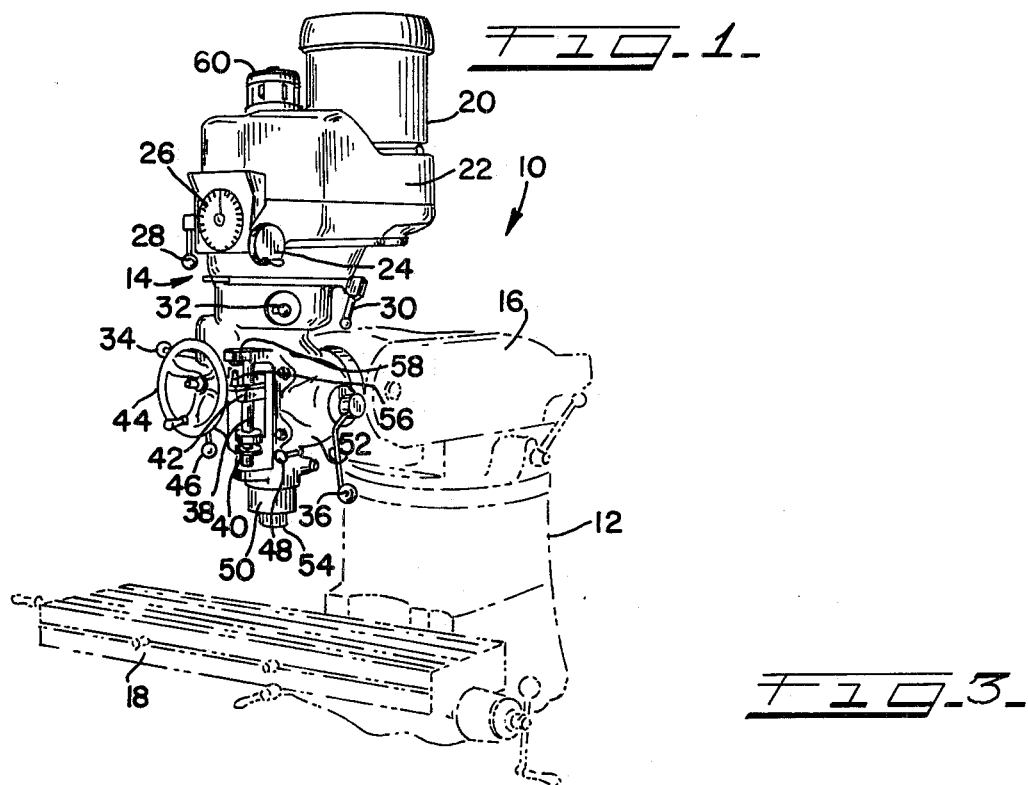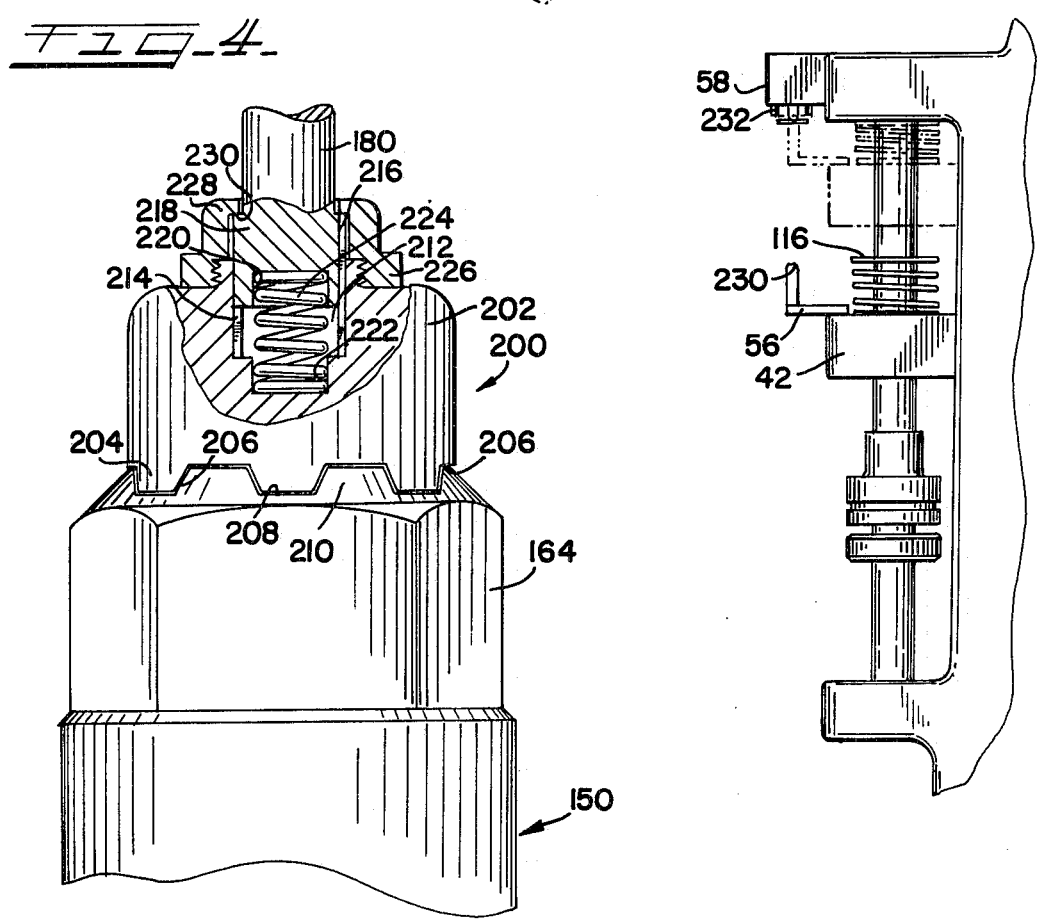

TOOL CHANGING APPARATUS

BACKGROUND OF THE INVENTION

The present invention relates generally to machine tools, and more particularly, to a semi-automatic tool changing apparatus which is advantageously used with or incorporated in machine tools which receive cutters, bits, or the like in a collet type chuck.

At present, many small and medium size machine tools, such as milling machines, for example, removably receive milling cutters in a spindle which in turn receives a collet. The collet is adapted to snugly engage the tool by radial compression when the body of the collet is urged into a taper by the action of a so-called drawbar. The drawbar is essentially a long bolt having a threaded portion adapted for cooperative engagement with counterpart threads in the end of the collet opposite the tool-receiving collet end. The drawbar also has a shank portion and a head portion which is engaged by a wrench manipulated by the operator when it is desired to change tools. This is accomplished by locking the spindle against rotation, loosening the drawbar, permitting the collet to slide slightly out of the taper and release its hold on the tool. Thereupon, a new tool is placed in the collet and tightened by opposite hand manipulation of the drawbar, or a new collet and a tool associated therewith are placed in the tapered spindle opening and locked in place by engaging threaded portion of the collet with the threaded drawbar end, and securing the collet in the taper by rotating the drawbar until the collet is snug in the taper.

In machine tools such as a "Bridgeport" brand vertical mill, the drawbar extends through the entire length of the spindle and the spindle reciprocates within a carrier known as the quill. The spindle is driven by a direct or indirect gear arrangement, and a quill and the spindle carried thereby are moved generally downwardly to a work-engaging position and, in some cases, continue to move axially (downwardly) while the tool engages the work so as to complete a milling operation.

In other cases, the quill remains in a fixed position and the work is moved radially thereof on the table, for example.

In machining operations, in which the tools and its associated collet are changed frequently, a considerable amount of time is spent manipulating the parts just referred to for the simple purpose of tool changing. In some cases, it has been proposed to simplify the tool changing task by the use of accessories, or by the use of special collets or fixtures. Devices of this sort have not usually met with significant acceptance, for at least two principal reasons, as well as others of less importance.

The first of these is that, with a number of machine tool attachments, the effect of so-called quick changing head devices is to situate the tool a significantly extended distance from the bearings which journal the quill and/or the spindle. In other words, where the tool chucking device extends downwardly from the position normally occupied by the collet, the structure supporting the tool is subject to a substantial moment arm and lacks the stiffness which is present when the tool is located close to the collet. Accordingly, as the work is fed to the tool, the tool may deflect enough to interfere with the making of precision cuts. In addition, such a cutting arrangement, which lacks the requisite stiffness, may be subject to chatter in use and will otherwise perform less satisfactorily than where the tool is held in a more rigid arrangement.

A second disadvantage of prior art tool holders intended to permit convenient tool changing is that the devices tend to multiply any misalignment in the spindle and/or quill by reason of extending well past a surface supported by bearings. Such so-called quick change adaptors themselves lack flexibility and, if less than perfectly square, do not perform as satisfactorily in use as would be theortically anticipated. In other words, the static and dynamic radial runout of the tool itself, even when no load is present, is undesirably multiplied. As a consequence, quick change devices of this character, which are basically additional locking devices in series with the locking devices forming a part of the basic machine, have never enjoyed widespread acceptance.

Moreover, inasmuch as these so-called quick change adaptors use specifically designed collets, they require purchase in complete sets, including a master adaptor, and the cost of such quick change adaptor with an array of collets may cost from perhaps $300 up to $600 or more. Still further, devices of this sort still require manipulating a cap nut in order to change the tool.

According to the present invention, an arrangement is provided in which the vertical mill or other machine tool using a drawbar locking system is or may be operated in the normal manner in use, but is provided with a combination quill overtravel switch, motor, and impact driver type assembly for intermittently engaging the drawbar head and locking or unlocking it automatically. In a typical use of a machine modified to incorporate the features of the present invention, after the quill is in its normal, raised position, the quill feed is moved just slightly upwardly of such preset position, and this energizes a motor and causes engagement between the drawbar impact drive driven by the motor and the drawbar, thus loosening the collet or clamping it in place within the end of the spindle.

According to the invention, the milling machine or the like operates in the normal mode throughout its normal range of quill travel, and the motor driven locking and unlocking arrangement is merely added to the top of the turret. The quill feed is arranged to return to a rest position just short of its normal, fully raised position. When it is raised further against the pressure of a spring, switch contacts are engaged as long as the quill is so held, for locking or unlocking the tool.

In view of the foregoing drawbacks of known tool changing systems for machines using drawbar tool locking systems, it is an object of the present invention to provide an improved locking and release mechanism for a machine tool unit.

Another object is to provide an improved machine tool having semi-automatic tool changing capabilities.

Another object of the invention is to provide a modified machine tool which operates in its normal mode but which may also be simply manipulated so as to release and lock the tool holder in a semi-automatic manner.

Yet another object is to provide a motor driven attachment to a machine tool which is adapted to facilitate locking and unlocking tools and collet chucks used to secure the tools in place within the machine.

A still further object is to provide an arrangement of machine tool, motor, and drive unit for intermittent connection between the motor and the drawbar serving to lock a tool holder in place within the unit.

Another object is to provide a low cost, simple and straightforward semi-automatic tool changer for a machine tool.

A still further object is to provide a machine tool holder locking and unlocking arrangement capable of using readily available, low cost elements or parts for providing intermittent engagement between a motor for supplying rotational energy and the drawbar which locks the tools in place within the machine.

A further object is to provide a quick, semi-automatic tool changing arrangement which does not require making any changes to the operating mode of existing machine tools.

Still another object is to provide a semi-automatic tool changer which is adaptable to different forms of milling machines and the like and which may be added to existing machines without great expense or difficulty.

The foregoing and other objects and advantages of the invention are achieved in practice by providing a tool holder arrangement including a locking and unlocking motor, cooperating clutch means associated with the motor and the drawbar for forming an intermittent, torque-transmitting connection therebetween, means for moving the clutch means into and out of engagement under the control of an operator, and means for energizing the motor when the drawbar and the motor portion are operatively engaged so as to permit tightening, loosening or releasing a tool or tool holder held in position within an associated machine tool.

The manner in which the foregoing and other objects and advantages of the invention are achieved in practice will become more apparent when reference is made to the following detailed description of the preferred embodiments of the invention set forth by way of example and shown in the attached drawings with which like reference numerals indicate corresponding parts throughout.

BRIEF DESCRIPTION OF THE DRAWINGS

FIG. 1 is a perspective view of a portion of a vertical milling machine modified in accordance with the present invention, and showing the table and tool stand in phantom lines;

FIG. 3 is a side elevational view of a part of the control arrangement of the invention, showing the switch element associated with the quill feed stop; and FIG. 4 is a vertical sectional view, on a further enlarged scale, with portions broken away, showing details of the intermittent clutch drive mechanism and engagement between a portion of the clutch mechanism and the drawbar head when the quill is in the raised position.

DESCRIPTION OF THE PREFERRED EMBODIMENTS OF THE INVENTION

Figure 2:
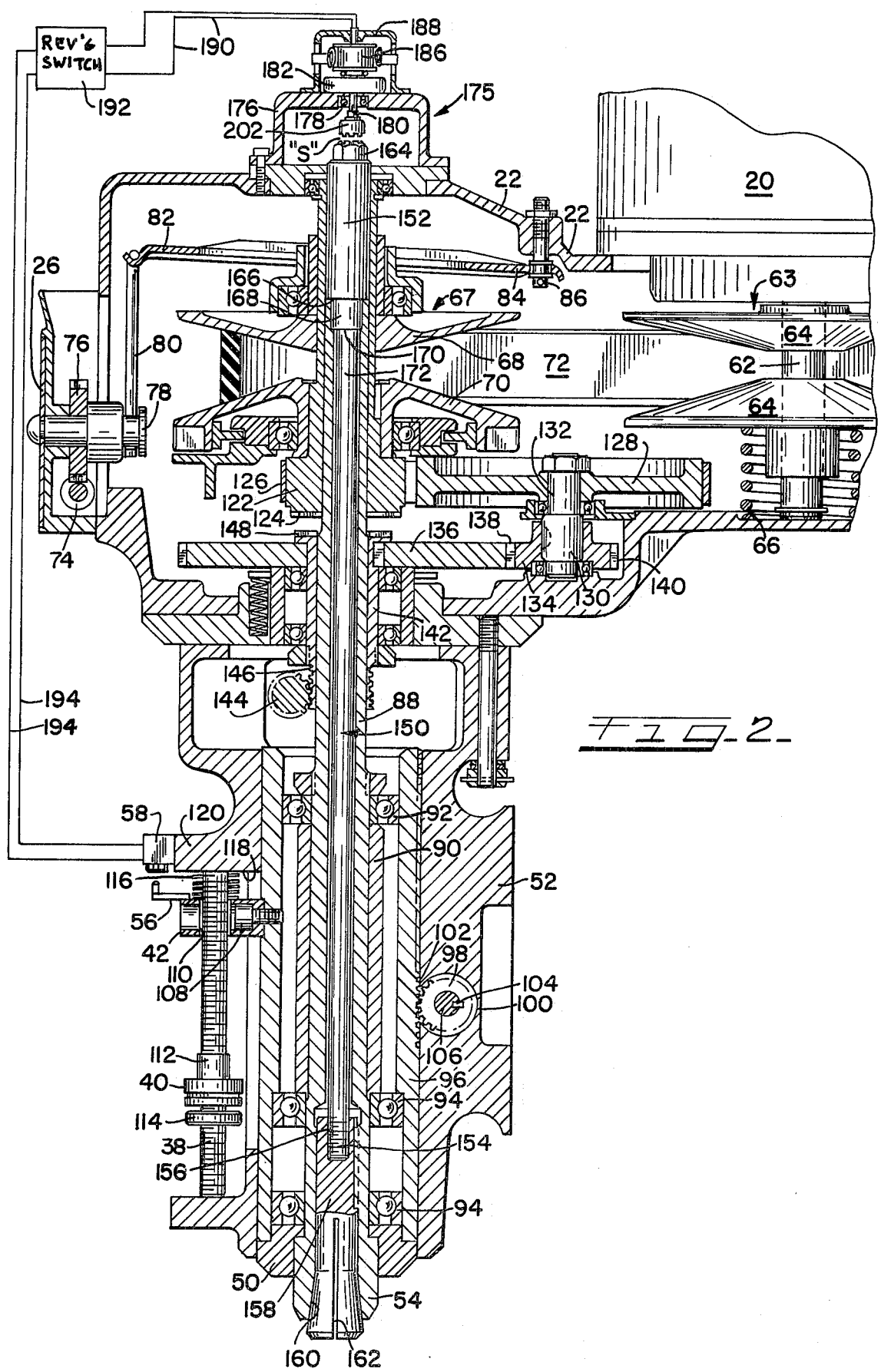
FIG. 2 is a greatly enlarged vertical sectional view of the milling machine head and drive unit, and showing the motor, clutch, and control unit of the invention.

While it will be understood that the present invention may be embodied in different forms, and may be adaptable for use with any machine tool using a drawbar type of collet lock, a detailed description of one form of the invention will be given wherein the apparatus is used in association with a vertical axis milling machine, such as a "Bridgeport Series 1" milling machine.

Referring now to the drawings in greater detail, FIG. 1 shows the invention to be embodied in a milling machine of a known type, generally designated 10, and shown to include a machine frame 12, a milling attachment 14, a ram 16, and a table 18. The head unit or milling attachment 14 includes a motor housing 20, a drive housing 22, a variable speed control crank 24 to alter the rate of spindle rotation, the selected rate being shown on the speed dial 26. A spindle brake 28, a gear selector lever 30, a power feed crank 32, and a quill feed selector 34 extending outwardly from the milling attachment 14 at various positions familiar to those skilled in the art. The unit 10 also includes a quill feed handle 35, a micrometer screw 38, an adjusting nut 40 and a quill stop 42 therefor as well as a manual feed wheel 44, a feed control lever 46 and a quill lock 48. The nose piece portion 50 of a reciprocable quill extends downwardly from the quill housing 52 and the nose piece portion 54 of the spindle is disposed within the quill nose piece 50; detailed reference to the quill and spindle is made herebelow.

According to the invention, an overtravel arm 56 is associated with the quill stop 42 for engaging a control switch 58 for a drawbar drive motor 60 which is disposed above the top drive housing 22. As will appear, upward movement of the quill stop to a position beyond its normally raised position will serve to activate a switch which will drive a drawbar locking and unlocking unit so that the cutting tool and the collet receiving it can be removed and replaced.

Referring now to FIG. 2, a sectional view of the head or milling attachment of the so-called variable speed drive type is shown to include the milling machine principal drive motor housing 20 secured atop the machine housing 22 and to include a shaft 62 in driving engagement with the two halves 64, 65, a pulley 63 of the axially separable type, the halves 64, 65 of which are urged by a spring 66 toward a closely spaced apart position. A similar, counterpart pulley assembly 67 having spaced apart halves 68, 70 is operatively connected to the first pulley 63 by a main drive V-belt 72. Pulley speed variation is accomplished by the provision of a drive speed control which includes a worm shaft 74 attached to the crank 24 and engaging a spur gear 76, the shaft 78 of which is attached to an arm 80 which variably positions the speed changer plate 82. The opposite end 84 of the plate 82 is secured by a pivot stud 86 to a portion of the drive housing 22. Moving the plate 82 moves the pulley halves 68, 70 more closely together or farther apart, thereby causing the spindle 88 to rotate at a particular speed which is displayed on the dial 26. The details of this particular spindle speed adjustment are known to those skilled in the art and, a further description not being necessary to the understanding of the invention, further description thereof will be omitted.

The spindle 88 is supported within a sleeve or spacer 90 by upper and lower ball bearing sets 92, 94, the outside portions of which are held in a quill 96, in the form of a hollow cylinder or sleeve.

The quill 96 reciprocates vertically in the quill housing 52 under the control of a quill feed pinion gear 98 having teeth 100 which engage a toothed quill rack 102 on the radially outer surface of the quill 96. The pinion gear 98 is secured, as by a key 104, to the shaft 106 attached to the quill feed handle 36. As is well known, the quill may be fed or lowered manually, as shown, or quill feed may be accomplished by power.

When the quill 96 reciprocates, the quill stop 42, which is secured to the quill 96 by the cap screw fastener 108, moves with it; the quill stop 42 includes a cylindrical inner bore 110 which slides over the micrometer screw 38. The micrometer adjusting nut 40 includes an upper collar 112 which engages the lower surface of the quill stop 42 at the lowest permitted travel point of the quill. A jam nut 114 is provided to lock the micrometer adjusting nut 40 against loosening when it is in place with respect to the screw 38.

An important feature of the invention is the overtravel arm 56, the control switch 58 and the spring 116 disposed between the upper surface of the stop 42 and the lower surface 118 of the micrometer screw mount 120.

Referring now to another feature of the invention, it will be appreciated that the spindle 88 in a machine of a Bridgeport type is capable of being driven in both a direct and an indirect or "back gear" mode; of course, the spindle will rotate both forwardly and in reverse in each mode. Because the "back gear" uses indirect gearing, where the main drive motor is rotating in a given direction, the spindle will rotate in the same direction as the motor when directly driven, but will rotate in the opposite direction when driven in the back gear mode. Accordingly, for forward spindle rotation in the bear gear mode, the motor must be operated in reverse.

It being understood that the gear drive is not a necessary feature of the present invention, but is a feature which is known to those skilled in the art, a brief description thereof will suffice for understanding of the present invention. When the motor in the housing 20 is driving, and the pulley halves 68, 70 are being driven by the belt 72, the spindle pulley hub 122, which includes axially directed teeth 124, rotates. This causes the timing belt 126 to rotate, spinning the timing gear 128 and the associated countershaft 130 which is keyed thereto, as at 132. This causes rotation of the bull gear pinion 134. If the bull gear 136 is in the position shown in FIG. 2, its teeth 138 will engage the teeth 140 on the bull gear pinion 134 and the bull gear 136 will rotate the spindle gear hub 142 and the spindle 88 which is splined therein.

On the other hand, if the spindle gear hub 142 and the bull gear 136 are raised sufficiently, by rotating the bull gear shift pinion 144, which engages the rack teeth 146, the axially facing teeth 148 on the spindle gear hub 142 will directly engage the axial teeth 124 on the spindle pulley hub 122. In this case, the spindle 88 will be driven directly by engagement between the hubs 122, 142, and while the gears 128, 40 are also rotating, there is no engagement between the bull gear pinion 140 and the bull gear 136. Consequently, the spindle may be driven directly, or with considerable gear reduction and in an opposite rotational sense with respect to the rotation of the motor, depending on the mode selected by the operator.

Referring now to the tool retaining features of the invention, a drawbar generally designated 150 is shown to extend axially through the spindle 88 centrally thereof and to terminate at one end in a head portion generally designated 152, and at the other end in a threaded portion 154. The latter portion is shown to be threadedly engaged with the bore 156 in a so-called R-8 collet 158 received in the taper 160 in the nose piece 54 of the spindle 88.

Slots 162 in the collet 158 permit radial compression of the collet when it is wedged in the taper in response to the axially applied force (upwardly as in FIG. 2) resulting from tightening engagement of the drawbar threads 154 in the upper end 156 of the collet 158. The head portion 152 includes a hexagonal cap 164, a shoulder 166 and a reduced diameter collar 168 forming another shoulder 170, from which the shank portion 172 extends downwardly.

Referring now to another principal part of the invention, a power locking and unlocking assembly, generally designated 175, is shown to include a locking drive housing 176 containing a set of upper housing bearings 178, journaling a shaft 180, one end of which is received in a transmission 182. The other end of the shaft 180 terminates in a drawbar driving member 184. A locking drive motor 186 disposed in a motor housing 188, rotates the shaft 180 when the motor is electrically energized, as will be explained. The motor 186 is electrically connected by lines 190 extending from a relay, schematically shown at 192, which is, in turn, energized by the current from the leads 194 extending from the control switch 58.

Referring now to FIG. 4, details of an assembly 200 adapted to form an impact-type drive for locking and unlocking the drawbar are shown. This assembly 200 includes a driving head 202 having teeth 204 defined by a plurality of generally downwardly facing, circumferentially extending surfaces 206, adapted to mate with upwardly facing surfaces 208 defining counterpart teeth 210 situated atop the head 164 of the drawbar 150. The driving head 202 includes an axially extending, generally cylindrical surface 212 having splines 214 therein adapted to mate with counterpart splines 216 on the lower end portion 218 of the motor driven shaft 180. This lower end portion 218 includes a counterbore 220 disposed opposite a counterbore 222 in the head 202. A compression type coil spring 224 is disposed between the head 202 and the lower portion 218 of the shaft 180, with the upper and lower ends of the spring 224 being received respectively in the counterbores 220, 222. A lock nut fitting 226 includes a flange 228 which engages a shoulder 230 on the shaft 180 to prevent axial separation of the shaft 180 and the head 202. The splines 214, 216 transmit torque between the shaft 180 and the head 202, while the teeth 204, 210, when mutually engaged, provide a drive connection between the driving head 202 and the drawbar head 164.

In the use of the clutch drive, assuming the parts are in the position shown in FIG. 4, and that the motor is energized so as to drive the shaft 180, the splined connection between the lower end 218 of the shaft 180, and the driving head 202 insures that the torque will be transmitted between these parts. When the teeth 204, 210 are in mutual engagement, and the drive head 202 is driven by rotation of the shaft 180, the drawbar will rotate and loosen the collet 158. When a predetermined torque value has been reached, assuming the drawbar to be in the process of being tightened, further rotation of the drawbar will be resisted and the teeth 204, 210 will disengage as the spring 224 is compressed and the drive head 202 rides upwards towards the bottom 218 of the shaft 180. When limited rotation has taken place and the teeth have slipped one notch, they will again be driven into a position of engagement by the spring 224 with the drawbar head 164 being given an additional impact. In this manner, the drawbar will be tightened, first by free spinning of the head 164 and then by a plurality of applied impacts. Unlocking the drawbar from the collet is accomplished in the same way except for rotation in the opposite direction.

Referring now to FIGS. 2 and 3, details of the overtravel switch arrangement are shown. This arrangement comprises the stop 42 which is secured to the reciprocable quill 96 and which reciprocates therewith, the overtravel arm 56, the overtravel switch 58, and the overtravel spring 116 which surrounds the micrometer screw 38 and is disposed between the lower surface 118 of the screw mount 120 and the upper surface of the stop 42.

In the use of the machine, the stop 42 reciprocates vertically as a unit with the quill, and when the adjusting nut 40 is placed in the desired position, downward quill movement is restricted by reasons of engagement between the lower surface of the stop 42 and the collar 112. Normally, upward movement of the quill is limited by the positions of the teeth of the rack and pinion arrangement for reciprocating the quill unit, and while the stop 42 will prevent excess upward travel, the stop is not normally used for this purpose. According to one preferred form of the invention, the overtravel arm is affixed to the stop 42, and the quill will normally be returned to the position shown in FIG. 2, that is, with the stop 42 spaced somewhat downwardly from the screw holder 120.

Consequently, the stop will move to a position just short of its maximum upward extent and remain at this point, inasmuch as the spring 116 prevents further unintentional upward movement. At this point, the upper or actuating portion 230 of the overtravel arm does not engage the contact portion 232 of the overtravel switch 58. However, the quill may be raised upwardly a small additional amount by movement of the quill feed handle or otherwise. Such movement compresses the spring 116 and causes engagement between the tip 230 of the arm 56 and the contact 232 of the switch 58.

At the same time, this movement takes up the slight space "S" (FIG. 2) between the drawbar head and the drawbar drive head 202, moving the parts 164, 202 into the position of FIG. 4, wherein there is engagement between the teeth 204, 210, respectively, and wherein additional movement, if any, is overcome only by oscillation of the drive head 202 portion of the clutch mechanism. As the quill and its associated stop 42 reach the uppermost position permitted by the construction of the machine, the switch 58 triggers the relay 192 which operates the motor, which in turn causes rotation of the drawbar so as to release the collet.

Thereupon, a new tool is inserted in the collet, or a new tool and collet combination is placed in the taper, the directional switch is reversed, and the quill feed is manipulated so as to compress the spring 116 and energize the motor. Positioning of the spindle and drawbar assembly so that the drawbar assembly forms a part of the clutch mechanism insures that the collet will be rapidly drawn tight in the taper, and that the tool will be held snugly in the collet.

As soon as the impact type drawbar drive mechanism indicates, by its operation, that the tool is tight, which normally requires only a matter of a second or more, upward force on the quill feed handle is released and the spring returns the quill to its normal but still raised position of use shown in FIG. 2.

To insert a new tool, the opposite sequence is followed, namely, the tool and collet are inserted into the taper and urged upwardly; then the quill is raised sufficiently to cause energization of the motor. The tool is then locked securely in position in a matter of a second or two, more or less.

According to the prior art, to change tools in this sort of machine it is necessary to raise the quill sufficiently so that the drawbar nut extends above the top of its associated housing, and then to apply the spindle brake or place the machine in back gear drive. Thereafter, the drawbar head can be unlocked with an appropriate wrench and further loosened by wrench or by hand until the collet releases the tool or until the collet itself is disengaged with the lower end of the drawbar and can therefore be removed as a whole. In prior art operations wherein multiple tool changing was carried out, a substantial amount of time was often wasted in manipulating the machine merely for the purpose of tool changing.

In the foregoing description, a relatively simplified form of intermittent connection device has been described. It possesses the advantage of initial impact drive and preset torque limiting in the mechanism rather than in the motor. A number of other types of impact drives are well known, and are typically embodied in pneumatic or electrically driven, hand held impact wrenches. Any mechanism of this type which permits impact action is suitable for use with the invention, it being understood that the exact functional details of such known devices do not form a part of the invention which is novel per se.

In some instances, it has been found that, either because of the configurations of the thread on the drawbar tip and within the bore of the collet, or because of the load imposed in performing machine operations, the collet tends to lock the tool more tightly in the taper upon use, and therefore, it sometimes requires more torque or a heavier impact to loosen a locked tool than it does to lock the tool initially. In some cases, therefore, it may be desired to construct the teeth on the top portion of the drawbar head and on the lower portion of the drawbar head in such a manner that a more nearly vertical angle of mutual engagement exists for counterclockwise rotation of the drive connection than exists for clockwise rotation thereof. This will result in a higher rotational torque for unlocking than for locking, assuming that a predetermined torque is supplied by the motor.

Other known mechanisms having different torque settings in different rotational directions may be substituted if desired. In other cases, the same torque may be required in both directions, and specially constructed or adjusted mechanisms are not required.

Although not described in detail, it is known that certain other machines, including lathes of certain types, for example, use a tool holding mechanism which includes a drawbar arrangement as a part thereof. Arrangements of this sort are fully adaptable to the semiautomatic tool changing apparatus of the invention. The principles of the invention are applicable to these and other, similar types of tool holders. As will be appreciated, the tools, once in place within the machine, are as fully supported by the collet arrangement as they are in machines which are not modified to incorporate the features of the invention. Consequently, the tools possess the accuracy and repeatability of operation which is inherent in the design of the machine. The modified machines avoid the undesirable additional runout or other characteristics which usually results when so-called "quick change" prior art tooling systems are applied, particularly those which involve supporting a tool a substantial distance from the chuck, in an otherwise unsupported holder arrangement. Such unsupported or poorly supported tools not only lack the concentricity of the tool changing apparatus of the invention, but have reduced stiffness in bending, causing such accessory systems to be more subject to chattering and to lack the ability to operate at high feed rates and under heavy loads with reasonable satisfaction.

In the form of the drawbar drive shown, two multitooth units engage each other in facing relation. Other types of mechanisms are known, including those which are used on hand held pneumatically or electrically operated impact "guns" or wrenches, and which operate on a principle analogous to that of a hammermill. For example, in one type of construction, a pivoted hammer is rotated by a driving element and the hammer strikes the driven element, and if a preset resistance is met, pivoting out of the way after striking the driven member, and then repeating the cycle.

It is possible according to the principles of the invention to use a drive of the impact gun type wherein the driving member for the drawbar consists of a ½" or ⅜" square drive stud and wherein the draw bar head is recessed or socketed so as to accomodate such a stud members. In this construction, over-travel upward movement of the drawbar creates engagement between the square drive stud and the socket in the head and energization of the motor applies impact and drive forces sufficient to permit tightning or loosening the drawbar as desired.

In any case, the principle of using a motor drive and means for engagement of the drive and the drawbar when the drawbar is in a particular position is used to simplify or automate tool changing.

In the form of tool changers shown, an electrically operated reversible motor is shown. In keeping with the concept of the invention, it is also anticipated that an air driven motor may be used, such as the type of air motor used on a pneumatic hand-held impact wrench or the like. The pneumatic motor is lighter and develops more power for its weight than a counterpart electric motor. However, it requires an air source and, in keeping with the invention, it would be anticipated that the reversing control of the motor would be disposed in a position which could be conveniently reached by the operator.

In connection with the foregoing description of the tool changing operation, it will be appreciated that, in order to lock or unlock the drawbar in a Bridgeport of like machine, it is desirable to apply the spindle brake, or to place the machine in back gear, wherein resistance to motion of the spindle is sufficient to permit the drawbar to be unlocked. However, in the use of the present invention it is desirable, although not in all cases strictly necessary, to apply the spindle brake or to place the unit in back gear drive before locking or unlocking the collet and drawbar.

It will thus be seen that the present invention provides an improved apparatus for locking and unlocking of tools and tool holders having a number of advantages and characteristics, including those pointed out herein and others which are inherent in the invention. Particular constructions of the preferred embodiments of the invention having been set forth by way of example, it is anticipated that various modifications and changes to the form of invention described herein will occur to those skilled in the art, and it is anticipated that such changes and modifications may be made without departing from the spirit of the invention or the scope of the appended claims.

What is claimed is:

1. An apparatus for power assisted locking and unlocking of tools received within the tool holder of a machine, said apparatus comprising, in combination, a tool receiving collet, a drawbar including a drawbar head portion, a shank portion and a collet engaging portion opposite said drawbar head portion, means forming a part of said apparatus for supporting said drawbar against said axial movement thereof toward said collet, a drawbar drive motor for rotating said drawbar in at least one direction, and a drawbar driving member associated with said motor, cooperating means on said drawbar driving member and said drawbar head portion for providing driving engagement between said motor and said drawbar in at least one position of said drawbar, drawbar positioning means for moving said drawbar between said one position in which said drawbar head is engaged with said driving member and at least one other, second position wherein said drawbar head and said driving member are spaced apart, means for energizing said motor when said drawbar head and said drawbar drive are in said position of driving engagement, said energizing means being operatively connected to said drawbar positioning means so as to energize said motor only when said drawbar is in said one position, and means for preventing unintentional movement of said drawbar from said other position to said one position.

2. An apparatus as defined in claim 1 in which said drawbar is received within a quill, in which said means for positioning said drawbar includes a quill feed mechanism, and in which said quill feed is constructed and arranged so as to permit said quill to move through a range of positions in addition to said one position and said second position.

3. An apparatus as defined in claim 1 wherein said cooperating means on said drawbar driving member and said drawbar head portion comprises an impact type drive unit.

4. An apparatus as defined in claim 1 wherein said drive motor is adapted for rotation in different directions, said means for energizing said motor being constructed and arranged so as to permit selection by an operator of the direction in which said motor will rotate.

5. An apparatus as defined in claim 1 wherein said cooperating means on said drawbar drive member and said drawbar head portion comprises a plurality of driving lugs having portions thereof extending axially toward each other from said driving member and said head portion respectively, and means normally urging said driving member toward said head member, said urging means also permitting movement of said driving member and said head portion away from each other upon application of a predetermined turning force.

* * * * *